M. W. SMITH.
BOLT AND NUT LOCK.
APPLICATION FILED MAR. 6, 1909.
944,288.
Patented Dec. 28, 1909.
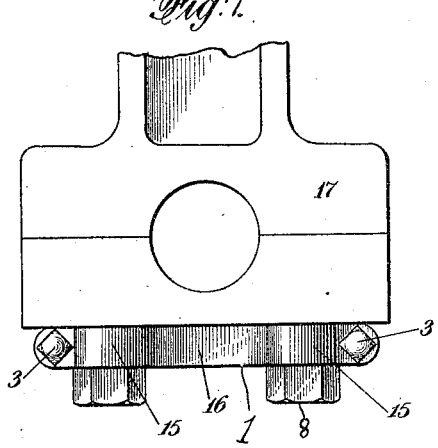
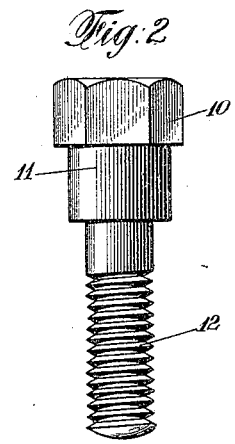
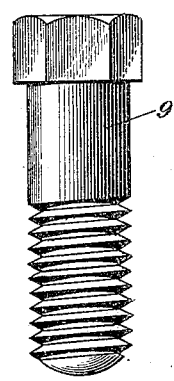
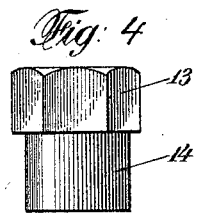
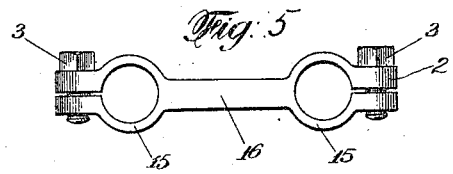
Witnesses:
M. Meikle
A. Newcomb
Inventor
Merritt W. Smith,
By his Attorneys
Prindle and Wright.

UNITED STATES PATENT OFFICE.

MERRITT W. SMITH, OF TROY, PENNSYLVANIA.

BOLT AND NUT LOCK.

944,288.

Specification of Letters Patent. Patented Dec. 28, 1909.

Application filed March 6, 1909. Serial No. 481,613.

*To all whom it may concern:*

Be it known that I, MERRITT W. SMITH, of Troy, in the county of Bradford, and in the State of Pennsylvania, have invented a certain new and useful Improvement in Bolt and Nut Locks, and do hereby declare that the following is a full, clear, and exact description thereof.

My invention relates to an improvement in bolt and nut locks.

The bolt and nut lock which constitutes an embodiment of my invention may be applied to bolts or nuts of any character upon a structure of any kind. I have, as a matter of fact, however, found my nut lock especially advantageous in securing the bolts or nuts in place which are used upon journal boxes; for example, the journal boxes used upon a pitman.

By the use of my nut lock, I am able to hold a bolt or nut in any adjusted position under a very great pressure, so as to prevent its moving to any degree whatever when once the locking member has been tightened. At the same time the parts are such that very little movement of the tightening means is required in order to loosen the parts to permit a readjustment of the bolt or nut.

The bolt or nut lock can be readily applied, if desired, to a bolt of the ordinary type without any change in the structure of the bolt.

I have shown one embodiment of my invention in the accompanying drawings, in which, Figure 1 is a side elevation of a pitman equipped with my nut lock; Figs. 2 and 3 are elevations of bolts to which my nut lock may be applied; Fig. 4 is an elevation of the nut to which my bolt and nut lock may be applied; and Fig. 5 is a plan view of the nut lock itself.

In the drawings, 17 is a pitman having bolts 8 extending into the same for securing the journal boxes thereof together. The bolts 8, as shown in Fig. 1, are retained in any adjusted position by means of a bolt and nut lock 1. The bolt and nut lock 1 comprises a strap 16, carrying at each end a split ring 15, each of which rings is provided with a pair of screw-threaded extensions 2 for receiving a screw 3. The bolt 8 may be constructed as shown in Fig. 2, or as shown in Fig. 3.

The modification shown in Fig. 2 comprises a squared head or tightening member 10, a cylindrical extension 11, and a screw-threaded shank 12. The modification shown in Fig. 3 comprises a similar squared head or tightening member and screw-threaded shank, but is provided with no cylindrical extension other than the unthreaded portion of the bolt 9. In Fig. 4 I have shown a nut to which my bolt and nut lock may be applied. This comprises a squared head or tightening member 13, and a cylindrical extension 14 similar to the corresponding parts described in connection with Fig. 2.

My bolt and nut lock operates very simply. The bolts or nuts which are received in the split rings are tightened in their proper position. The screws 3 are then tightened so as to bring the ends of the extensions 2 of the split rings 15 together, thereby tightening the split rings around the cylindrical portions of the bolts or nuts. When so tightened the frictional contact between the split rings 15 and the cylindrical extensions of the bolts or nuts will effectively prevent the latter from becoming untightened.

While I have described my invention above in detail, I wish it to be understood that many changes may be made therein without departing from the spirit thereof.

I claim:—

In a device of the character described, the combination of a plurality of screw-threaded shanks, a tightening member for tightening each of said shanks in its holding position, a cylindrical member attached to each said tightening member, and an expansible ring lock adapted to coöperate with each of the cylindrical members to prevent it from turning, said expansible rings being connected together.

In testimony that I claim the foregoing I have hereunto set my hand.

MERRITT W. SMITH.

Witnesses:
H. MITCHELL,
MARTHA R. MITCHELL.